Figure 5:
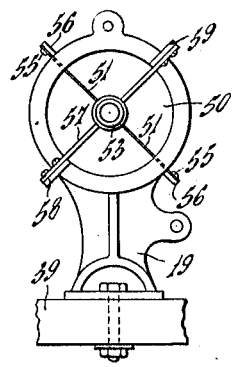

A. LYELL.
APPLE PARING, CORING, AND SLICING MACHINE.
APPLICATION FILED NOV. 20, 1909.
1,019,675.
Patented Mar. 5, 1912.
2 SHEETS—SHEET 1.
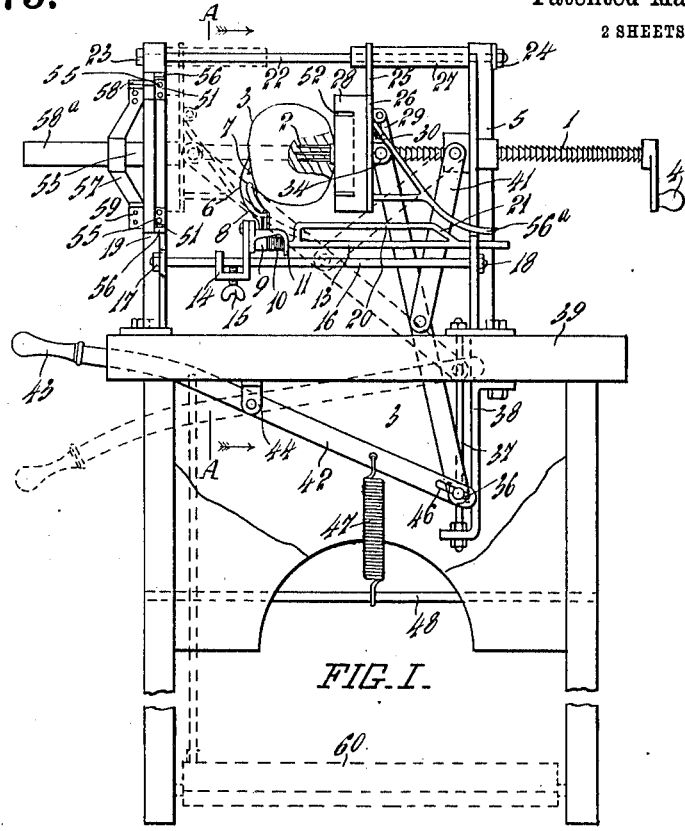
FIG. I.
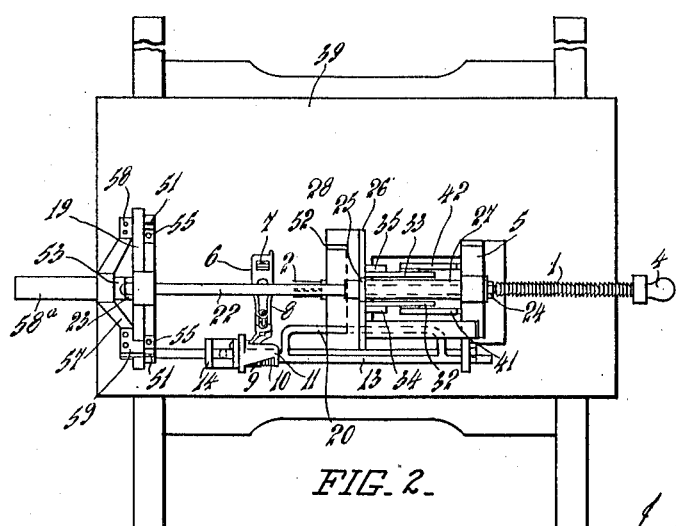
FIG. 2.
Witnesses:
Inventor:
August Lyell,
By Fisher, Freeman, Watson & Coit,
Attorneys.

A. LYELL.
APPLE PARING, CORING, AND SLICING MACHINE.
APPLICATION FILED NOV. 20, 1909.

1,019,675.

Patented Mar. 5, 1912.

2 SHEETS—SHEET 2.

Witnesses:

Inventor.
August Lyell,
By Fisher, Freeman, Watson & Coit,
Attorneys.

UNITED STATES PATENT OFFICE.

AUGUST LYELL, OF WELLINGTON, NEW ZEALAND.

APPLE PARING, CORING, AND SLICING MACHINE.

1,019,675.  Specification of Letters Patent.  Patented Mar. 5, 1912.

Application filed November 20, 1909. Serial No. 529,110.

*To all whom it may concern:*

Be it known that I, AUGUST LYELL, a subject of His Majesty the King of Great Britain and Ireland, and residing at 215 Lambton Quay, Wellington, in the Provincial District of Wellington, in the Dominion of New Zealand, have invented certain new and useful Improvements in Improved Apple Paring, Coring, and Slicing Machines, of which the following is a specification.

This invention relates to machines for preparing apples for cooking, preserving and the like, and has for its object to provide a machine which in one operation will pare, core, and slice apples into quarters, halves or other parts.

According hereto a screw provided with a fork at one end and an operating handle at the other, and a swiveling spring operated knife, are employed. In these respects the apparatus resembles to a great extent machines already in use.

A bracket provided with an opening has knives fixed across the opening and converging upon a tubular cutter.

A disk of wood pushes the apple through the opening in the bracket, the knives of which cut out the core and slice the apple into parts parallel with the core. The swiveling knife is depressed, and a lever is operated to return the disk to its original position.

The drawing herewith illustrates the invention.

Figure 3:
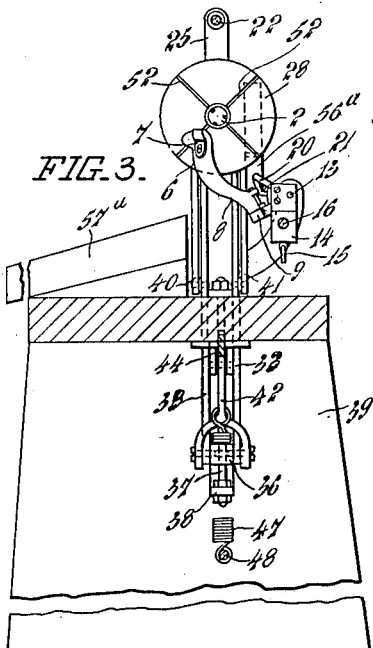
Figure 6:
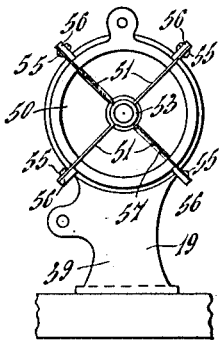
Figure 4:
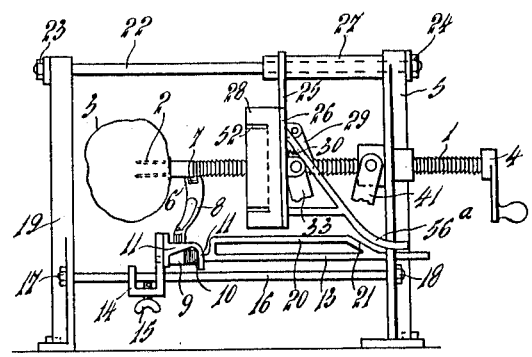
Figure 7:
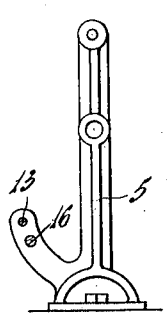
Figure 8:
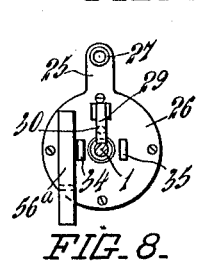
Figure 9:
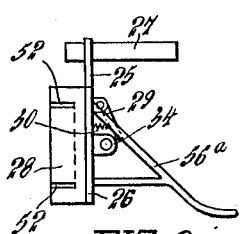

Figure 1, is a side elevation, Fig. 2, a plan, and Fig. 3, a sectional elevation on line A—A, Fig. 1 of the apparatus, Fig. 4, a side elevation of part of the apparatus, Fig. 5, an elevation of one side, and Fig. 6, an elevation of the reverse side of a bracket, Fig. 7, an elevation of a bracket, Fig. 8, an end elevation, and Fig. 9, a side elevation of a disk and gear.

The screw 1 is provided at one end with the usual fork 2 for holding an apple 3 and at the other end has an operating handle 4. The screw is mounted slidably in a bracket 5, but is not threaded thereinto.

The paring knife 6 is of ordinary construction and consists of a blade 7 mounted in a stem 8 swiveled to an arm 9. A spring 10 contained within a bracket 11 and having one end secured to the arm and the other end to the bracket, tends to keep the knife in its raised position. This construction is well known in this class of machinery.

The arm 9 is fixed upon a rod 13 which is pivoted in the bracket 5 and a clamp 14 whereto the bracket 11 is rigidly secured. The clamp may be fixed by its screw 15 in any position upon a rod 16 secured by nuts 17 and 18 to the bracket 5 and to an opposing bracket 19. The rod 13 has a side member 20 comprising a rod integral at its ends with the rod 13 and having a slope 21 at one end.

The brackets 5 and 19 are united at the top by a rod 22 and nuts 23 and 24. A bracket 25 comprising a plate 26 and a long sleeve 27 is slidable on the rod 22. The screw 1 and its fork 2 pass freely through a hole formed in the plate 26 and through a disk 28 preferably of wood and fixed to the said plate. A pawl 29 pivoted to the plate 26 engages the thread of the screw 1, and is retained in engagement therewith by a spring 30 attached at one end to the pawl and at the other end to the plate 26.

Rods 32 and 33 are pivoted at one end respectively to lugs 34 and 35 fixed to the plate 26, and at the other end are pivoted to a block 36 slidable on a vertical rod 37 fixed to the bracket 5 and to a hanging bracket 38 secured to the stand 39 of the apparatus. Links 40 and 41 pivoted to the bracket 5 are pivoted at their other ends to the rods 32 and 33 respectively. A lever 42 having at one end a handle 43 is fulcrumed to a bracket 44 secured to the stand 39, and at the other end the lever has a slot 46 whereby it is pivoted to the block 36. A spring 47 secured at one end to the lever 42 and at the other end to a bar 48 of the stand 39 tends to keep the block 36 at the bottom of the rod 37.

The bracket 19 has an opening 50 sufficiently large to allow an apple to pass freely, and across this opening are fixed radial knives 51 having cutting edges opposing the disk 28, which has radial slots 52 corresponding to the knives. A tubular cutter 53 positioned axially within the opening 50 has a cutting edge or rim facing the disk 28. The knives 51 are secured by screws 55 to lugs 56 projecting radially from the bracket 19 which has slots through which the knives pass and converge on the tubular cutter 53.

The end of the cutter 53 is supported by a bridge piece 57 bolted to lugs 58 and 59 integral with the bracket 19, the said bridge piece being located at an angle corresponding to the angle of two opposing knives 51.

If desired the lever 42 may be operated by a treadle 60 as shown by dotted lines in Fig. 1.

The clamp 14 is adjustable to suit apples of various sizes. Thus, when a quantity of apples of small size are to be prepared the knife 6 is fixed nearer to the bracket 5, thereby saving useless turning of the screw 1 before the apple is brought into contact with the said knife.

In operation, an apple 3 is placed upon the fork 2 while the parts are in the position shown in Fig. 1, the handle 4 is turned and the pawl 29 being in engagement with the thread of the screw, the apple, as it rotates advances in the direction of the bracket 19, the knife 6 paring the apple in a well known manner. When the apple has reached a position beyond the knife 6 as shown in Fig. 4, the handle 43 is depressed, causing the block 36 to slide upward upon the rod 37, and by means of the rods 32 and 33 and links 40 and 41, the disk 28 to slide toward the apple and push it through the opening 50. The knives 51 and the cutter 53 cut out the core and slice the apple into parts parallel with the core during its passage through the opening, the slots 52 and its central hole allowing the disk to enter the said opening. During the advance of the disk, the pawl 29 rides over the thread of the screw 1, and a wiper 56ª secured to, or integral with the plate 25, contacts and depresses the side member 20, thereby depressing the stem 8 which is thus turned out of the way to allow the return movement of the disk, which is effected by the spring 47 after the handle 43 has been released by the operator. The parings from the knife 6 fall into a chute 57ª, the cores from the cutter 53 pass through a chute 58ª fixed to the bridge piece 57, and the divided portions of the apple from the opening 50 and are caught in a basket, dish or other desired receptacle. The return movement of the disk, returns the screw 1 to its original position shown in Fig. 1, owing to the engagement of the pawl 29 with the thread of the screw.

What I do claim and desire to secure by Letters Patent of the United States is:—

1. In a machine for paring, coring and cutting apples, the combination of a supporting frame, a paring knife carried by a holder mounted on the frame to rock about a horizontal axis, a coring and cutting device at one side of the knife, an apple supporting fork carried by a threaded shaft, means for rotating the shaft, a stripper movable longitudinally over the fork to and from the cutting and coring device, a pawl carried by the stripper and engaging the threaded shaft of the fork, whereby the fork is moved past the knife as it is rotated, and means connected with the stripper for positively rocking the paring knife support to carry the knife from the path of the stripper.

2. In a machine for paring, coring and cutting apples, the combination of an apple supporting fork, a cutting and coring device in alinement with said fork, a paring knife supported by a rocking frame having a member extending longitudinally of the fork, means for rotating the fork and moving it longitudinally to carry an apple supported thereby past the paring knife, and a stripper entirely surrounding the stem of the fork and movable over the fork head to and from the cutting and coring device, said stripper being adapted to engage the support of the paring knife and rock said knife from the path of the stripper.

3. In a machine of the character described, the combination of a frame, a cutting and coring device at one end of the frame, an apple supporting fork mounted in the frame in alinement with the cutting and coring device, a support for the paring knife mounted to rock about an axis extending parallel to the length of the apple fork and adjustable longitudinally to vary the distance between the knife supported thereby and the cutting and coring device, a stripper movable longitudinally of the fork, and an arm attached to the stripper and adapted to engage the paring knife support to rock the same and carry the knife from the path of the stripper as the latter is moved over the fork head to force an apple therefrom and through the cutting and coring device.

In testimony whereof I have signed my name to this specification in the presence of two witnesses.

AUGUST LYELL.

Witnesses:
H. H. A. RENAI,
H. A. HIGBEE.

---

Copies of this patent may be obtained for five cents each, by addressing the "Commissioner of Patents, Washington, D. C."